King & Mason,
Clothes Frame,
N°. 69,349. Patented Oct. 1, 1867.
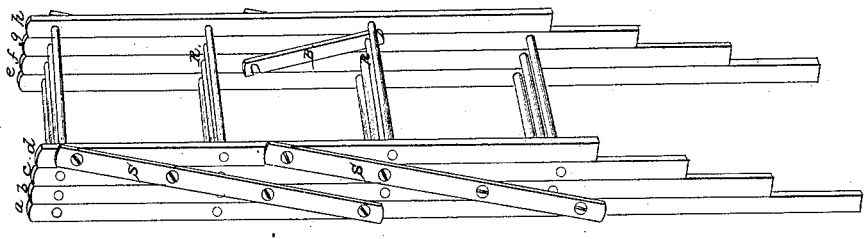
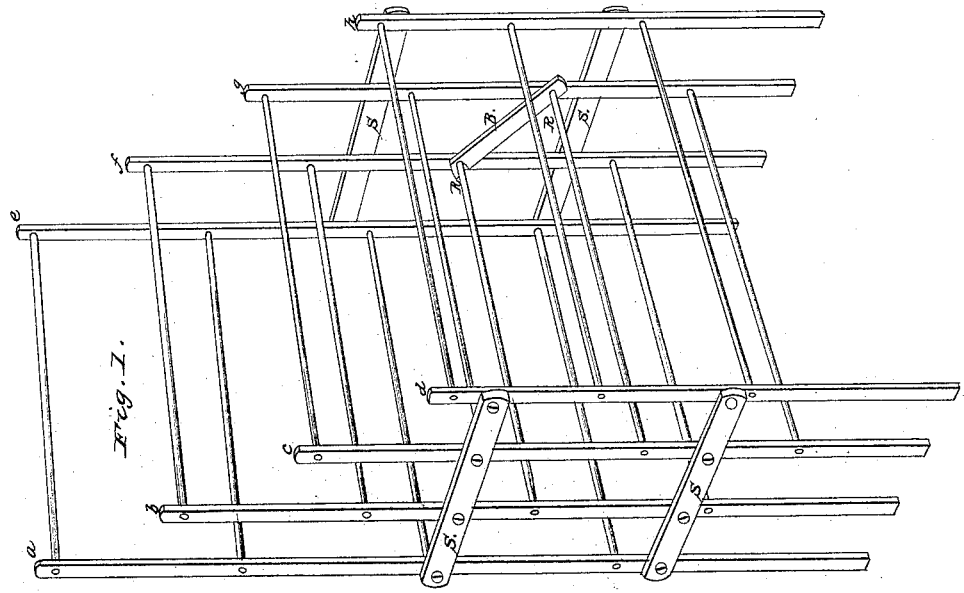
Witnesses:
Mary Costille.
Mary Phelen.
Inventors:
Henry N. King.
Austin J. Mason

United States Patent Office.

HENRY N. KING AND AUSTIN Z. MASON, OF ADRIAN, MICHIGAN.

Letters Patent No. 69,349, dated October 1, 1867.

---

IMPROVED CLOTHES-DRIER.

---

The Schedule referred to in these Letters Patent and making part of the same.

---

TO ALL WHOM IT MAY CONCERN:

Be it known that we, HENRY N. KING and AUSTIN Z. MASON, both of Adrian, in the county of Lenawee, and State of Michigan, have invented a new and useful improvement in Clothes-Frames; and we do hereby declare that the following is a full, clear, and exact description of the construction and operation of the same, reference being had to the annexed drawings, making a part of this specification, and to the letters of reference marked thereon, in which—

Figure 1 is a perspective view of the clothes-frame when open ready for use.

Figure 2, a perspective view of the frame when shut up and not in use.

To enable others skilled in the art to make and use my invention, I will proceed to describe its construction and operation.

This invention is designed to be used for hanging wet clothes on while they are drying, and consists of eight standards, $a, b, c, d, e, f, g$, and $h$, fig. 1 of the drawing, each to be constructed of suitable dimensions of any kind of light wood. These standards are coupled together by means of round wooden rods into four bents in the form of rectangles, each bent consisting of two standards, and four round rods at equal intervals, each bent standing perpendicularly upon the floor. The standards are of unequal height, the two forming the rear bent being several inches longer than the two forming the bent $b\ f$ just front of it, and the bent $b\ f$ several inches higher than the bent $e\ g$, fig. 1, and so with the bent $d\ h$, which contains but three round connecting-rods. That is, each bent is several inches higher than the one immediately in front of it, as shown in the drawing, the whole frame containing fifteen round connecting-rods. These four bents are kept parallel, and at equal distances apart by means of four slats, S S S S, fig. 1, which, when the frame is open, as shown in fig. 1, are parallel and horizontal. Two of these slats are on one side and two on the other side of the frame, crossing the standards at right angles. Through these standards and slats at each point of contact there is placed a screw fastened firmly into the standards and turning upon the slats, the heads of the screws keeping the slats in their places. Two of the rounds R R, fig. 1, are supplied with a brace, B, which turns upon one of them and hooks upon the other, the brace having a slot cut in it near the upper end for the purpose of locking upon the round.

In order to close the frame, which is shown by fig. 1 to be open, we have only to raise the upper end of the brace B away from the round R, and then, holding the rear bent, raise the front bent a little up, and pressing it towards the rear bent thus bring the four standards on either side so that their edges touch together, closing the frame, as shown at fig. 2. The frame when thus closed takes up but little space. The frame when in use may stand upon the floor, or it may be hung upon hooks in the wall, so as to be more out of the way.

What we claim as our invention, and desire to secure by Letters Patent, is—

The construction and use of the four bents $a\ e$, $b\ f$, $e\ g$, and $d\ h$, the four slats S S S S, and the brace B, the whole constructed and operating substantially in the manner and for the purpose set forth.

HENRY N. KING,
AUSTIN Z. MASON.

Witnesses:
MARY CASTELLO,
MARY PHELAN.